Patented Aug. 19, 1924.

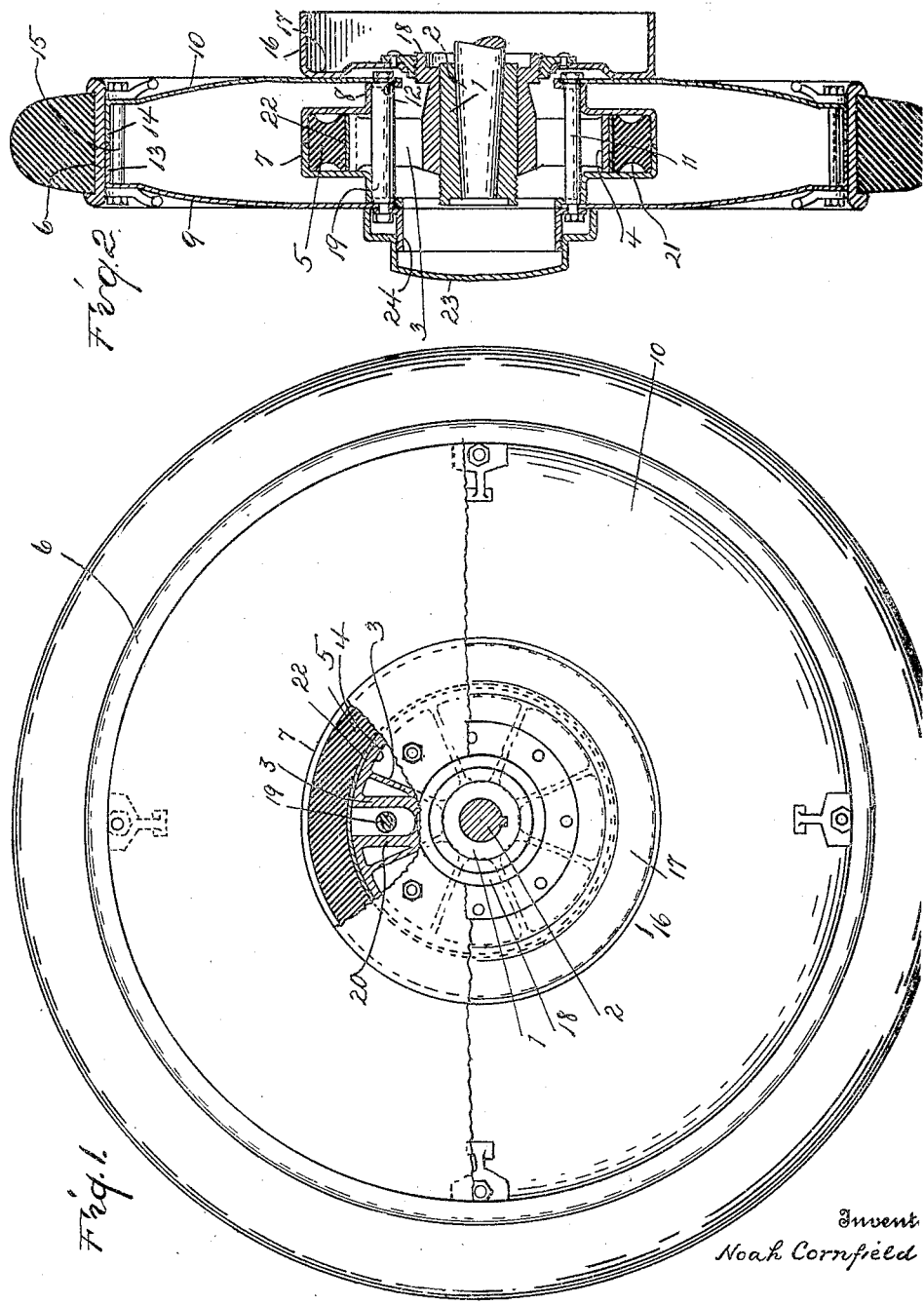

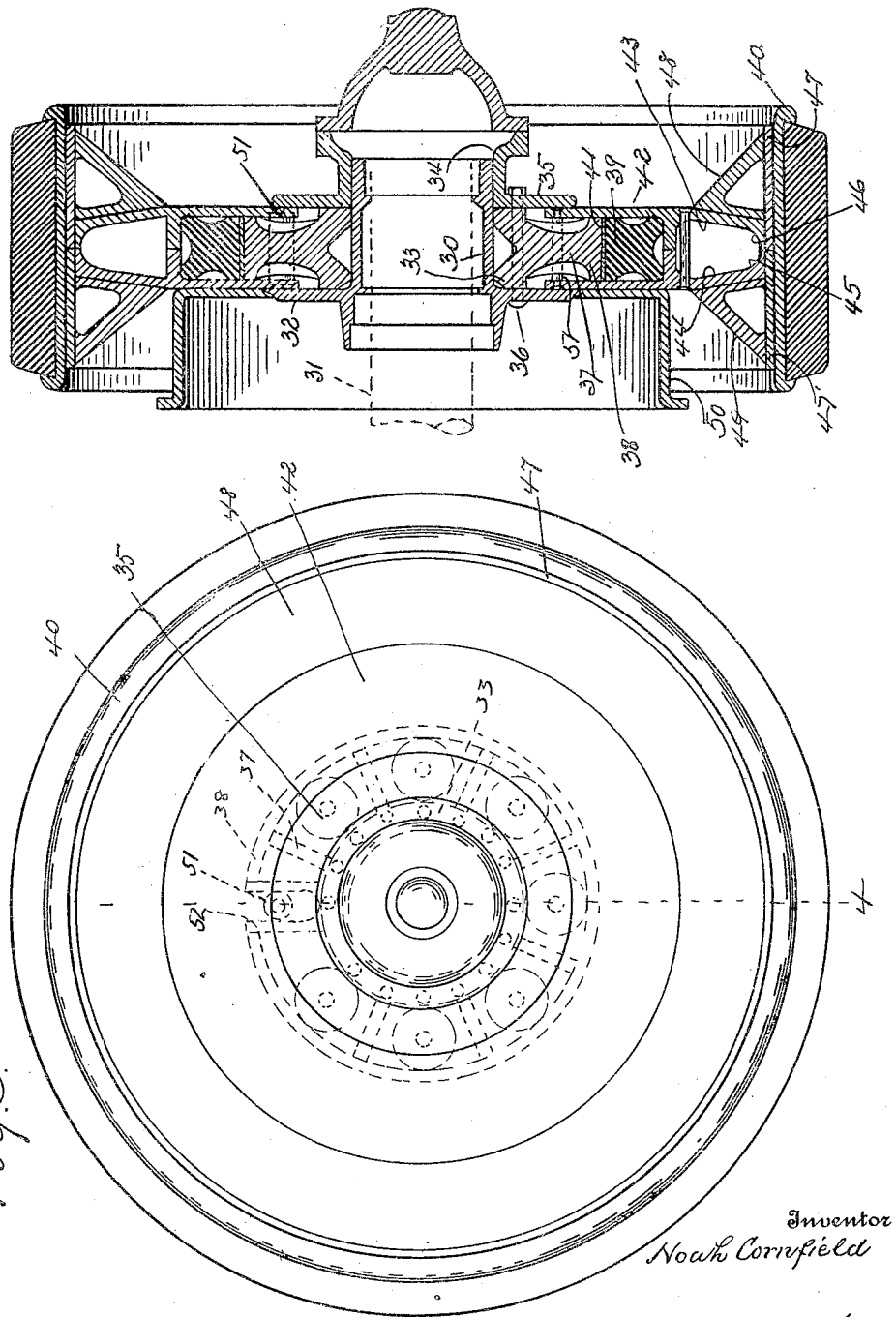

1,505,926

UNITED STATES PATENT OFFICE.

NOAH CORNFIELD, OF DETROIT, MICHIGAN, ASSIGNOR TO ACME CUSHION WHEEL COMPANY, OF WILMINGTON, DELAWARE, A CORPORATION OF DELAWARE.

VEHICLE WHEEL.

Application filed October 18, 1922. Serial No. 595,348.

*To all whom it may concern:*

Be it known that I, NOAH CORNFIELD, a citizen of the United States of America, residing at Detroit, in the county of Wayne and State of Michigan, have invented certain new and useful Improvements in Vehicle Wheels, of which the following is a specification, reference being had therein to the accompanying drawings.

This invention relates to wheels and refers particularly to improvements in resilient vehicle wheels.

An object of the invention is to provide simple and effective cushion means between the hub and rim for taking care of the stresses.

Another object is to provide an efficient and reliable drive connection between the hub and rim which will not effect the cushion means.

Another object is to provide a strong and durable wheel which is simple in construction and which can be manufactured at a very low cost.

With the above and other objects in view the invention consists in certain novel features of construction, combination, and arrangement of parts as will be more fully described and particularly pointed out in the appended claims.

In the accompanying drawings:

Figure 1 is a side elevation partly in section, with a portion of one disk removed, of a wheel embodying my invention and showing parts broken away.

Figure 2 is a sectional view taken on line 2—2 of Figure 1;

Figure 3 is a side elevation of a slightly modified construction and showing parts in dotted lines;

Figure 4 is a sectional view taken on line 4—4 of Figure 3.

Referring now to the drawings in which like characters of reference designate corresponding parts throughout the several views, the numeral 1 designates a hub splined upon a drive axle 2. A plurality of spokes 3 extending radially from the hub are integrally connected at their ends to a ring 4.

For yieldably supporting the hub there is an annulus 5, preferably of rubber, which is carried from the rim 6. In detail, the annulus surrounds the ring 4 and is located in a sectional casing 7, which engages the opposite edges of the ring. The casing is preferably U-shape in cross-section and is provided at its opposite edges with laterally extending flanges 8 of L-shape in cross-section. These flanges are secured to a pair of spaced disks 9 and 10 respectively by means of a plurality of bolts 11. Each of the bolts are provided adjacent to their opposite ends with annular shoulders 12 which serve as abutments for the flanges 8 and retain the disks in proper spaced relation. The disks are preferably concavo-convexed in shape and are provided at their outer edges with laterally extending flanges 13 and 14. These flanges extend inwardly and preferably abut each other. The tire rim 6 is placed on the flanges 13 and 14 and is preferably welded thereto to secure a firm engagement. For reinforcing the rim connection, there are a plurality of bolts 15 which extend through the disks aforesaid adjacent to the flanges 13 and 14. A brake drum 16 is provided with an annular flange 17 which has a sliding engagement with the disk 10 and is connected to an annular flange 18 at the inner end of the hub.

For driving the rim from the hub there is a bolt 19 which is secured to the disks 9 and 10 and flanges 8 and engages an inwardly extending U-shaped portion 20 of the ring 4. Rotation of the drive axle causes the hub and ring to rotate which in turn causes the bolt 19 to rotate the side disks and rim of the wheel. The arrangement is such that the rotation of the hub, ring and disk does not affect the resilient annulus 5, consequently the annulus is free to function solely as a cushion member.

In operation, the load upon the axle is suspended from the wheel rim by means of the hub 1, spokes 3, ring 4, resilient annulus 5, casing 7, and the side disks 9 and 10 of the wheel. Owing to the fact that the resilient annulus is placed in the casing while in its natural state and in view of the fact it is preferably provided with semi-circular grooves 21 in the opposite sides thereof, the full resiliency of the annulus is secured.

For preventing wear upon the resilient annulus during any relative movement between the ring and the annulus, there is a split steel band 22 which is secured to the annulus and forms a bearing therefor upon the ring. For protecting the hub and other parts of the wheel from dirt, dust, etc., there is an auxiliary cap 23 threadedly engaging an annular flange 24 of L-shape in cross-section which is secured to the disk 9 by means of the bolts 11.

In the modification illustrated in Figures 3 and 4, a hub 30 is mounted upon a drive axle 31 and is provided with an annular flange 32 which serves as an abutment for an annular spacer 33 surrounding the hub. A sleeve 34 is also mounted on the hub and is provided with an annular flange 35 which abuts the other side of the annular spacer 33. The flange 35 and spacer 33 are secured to the annular flange 32 by means of a plurality of bolts 36. The spacer is provided with a plurality of radially extending spokes 37 which are formed integral at their outer ends with a ring 38.

For yieldably supporting the hub 30 there is a resilient annulus 39 which is carried from the tire rim 40. This annulus is preferably similar in construction to the annulus 5. A split steel band 41 is secured to the annulus 39 and surrounds the ring 38. A sectional casing 42, preferably, U-shape in cross-section encloses the annulus 39 and engages the opposite edges of the ring 38. This casing is preferably provided at its outer edges with annular converging extensions 43 and 44 which are in turn provided at their outer edges with laterally extending flanges 45 and 46. These flanges extend inwardly and preferably abut each other. Rings 47 and 47' are pressed upon the flanges 45 and 46 and are preferably welded thereto to secure a firm engagement. The tire rim 40 is sleeved upon the rings 47 and 47' and is rigidly secured thereto by welding. For reinforcing the rim connection there are a pair of annular braces 48 and 49 which are rigidly secured to the rings 47 and 47' and extensions 43 and 44. A brake drum 50 surrounds the hub 30 and is rigidly secured to one side of the casing 42.

For driving the rim 40 from the hub 30, there is a bolt 51 which is secured to the sections of the casing 42 and engages an inwardly extending U-shaped portion 52 of the ring 38. Rotation of the drive axle causes the hub 30 and ring 38 to rotate which in turn causes the bolt 51 to rotate the casing, extensions 43 and 44, and the rim 40 of the wheel. The arrangement is such that rotation of the hub ring 38 and casing does not affect the resilient annulus 39, and thus permits the same to function solely as a cushion member. In operation, the load upon the axle is suspended from the wheel rim 40 by means of the hub spokes 37, ring 38, resilient annulus 39, casing 42 and extensions 43 and 44.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a wheel, the combination with a hub and a rim, of a ring member connected to said hub, a cushion member sleeved upon said ring member, and a sectional housing embracing opposite sides of said cushion member and carried from said rim.

2. In a wheel, the combination with a hub and a rim, of a member carried by said hub, cushion means for said hub engaging said member, means carried by said rim cooperating with said member for engaging all sides of said cushion means, and means for driving said rim from said hub.

3. In a wheel, the combination with a hub and a rim, of a ring connected to said hub, yieldable means surrounding said ring, and a casing embracing opposite sides of said yieldable means and supported from said rim.

4. In a wheel, the combination with a hub and a rim, of a ring connected to said hub, a resilient annulus surrounding said ring and having grooves in the sides thereof, and a casing embracing opposite sides of said annulus and supported from said rim.

5. In a wheel, the combination with a hub and a rim, of a ring member secured to said hub, a yieldable member mounted on said ring member, a casing for said yieldable member, members secured to said rim and enclosing said casing, and a driving connection between the last-mentioned members and said ring member.

6. In a wheel, the combination with a hub and a rim, of a ring member secured to said hub, a yieldable member mounted on said ring member, a casing for said yieldable member, members secured to said rim and enclosing said casing, and a member connecting the last-mentioned members and said casing together and having a driving connection with said ring member.

7. In a wheel, the combination with a hub and a rim, of a ring member secured to said hub, a yieldable member mounted on said ring member, a casing for said yieldable member, disks secured to said rim and enclosing said casing, a member connecting said disks and said casing together, and a driving connection between said disks and said ring.

8. In a wheel, the combination with a hub and a rim, of a ring member connected to said hub, a yieldable member mounted on said ring member, a casing engaging opposite sides of said yieldable member and connected to said rim, and a driving connection between said casing and said ring.

9. In a wheel, the combination with a hub and a rim, of a ring member mounted on said hub, means for securing said ring member to said hub, a yieldable member mounted on said ring member, a casing engaging opposite sides of said yieldable member and connected to said rim, and a driving connection between said casing and said ring.

10. In a wheel, the combination with a hub and a rim, of a ring member mounted on said hub, means for detachably securing said ring member to said hub, a resilient annulus mounted on said ring member, a casing embracing opposite sides of said annulus and connected to said rim, and a driving connection between said casing and said ring.

I testimony whereof I affix my signature.

NOAH CORNFIELD.